June 4, 1963  J. H. DEPPELER, JR., ETAL  3,091,825
MOLD WELDING
Filed March 29, 1960  3 Sheets-Sheet 3
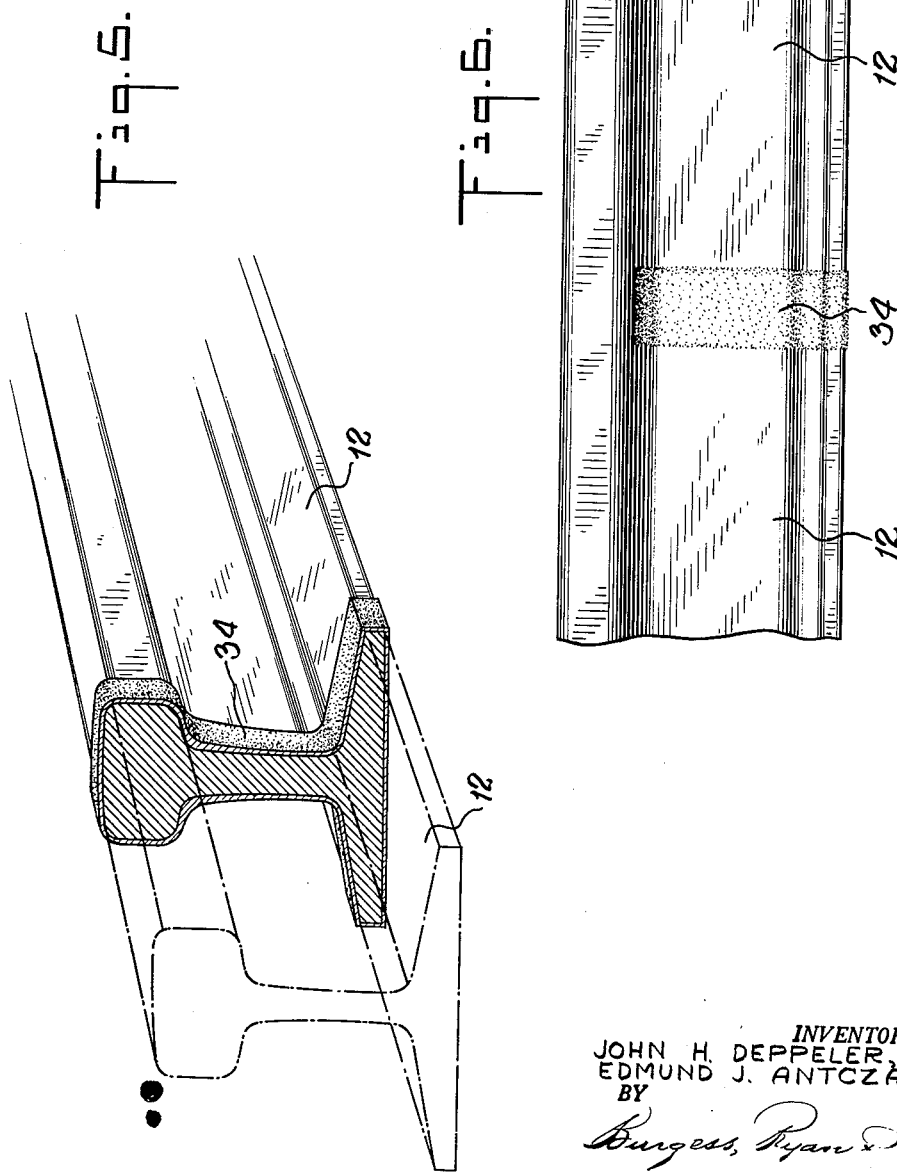
INVENTORS
JOHN H. DEPPELER, JR.
EDMUND J. ANTCZAK
BY
ATTORNEYS United States Patent Office 3,091,825
Patented June 4, 1963

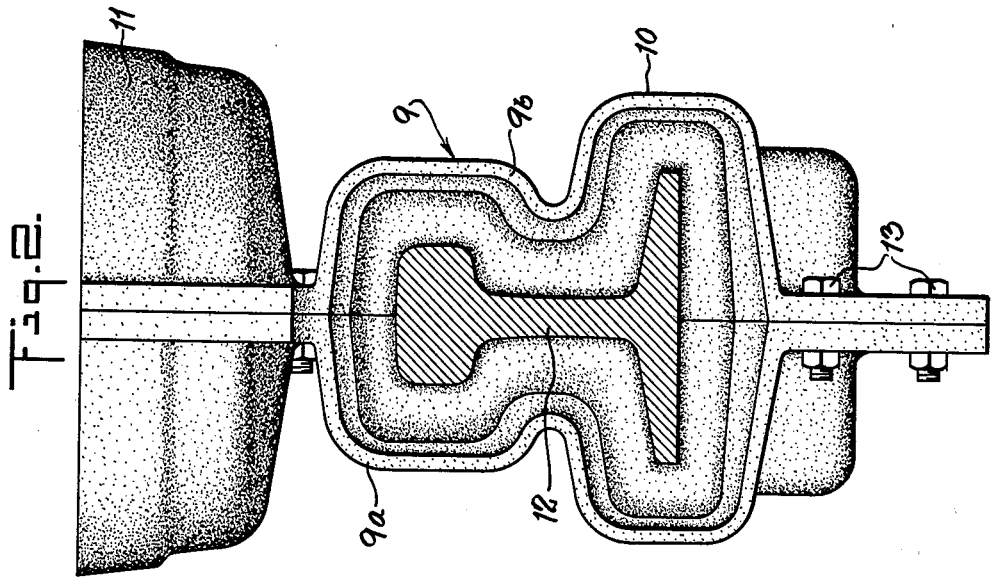
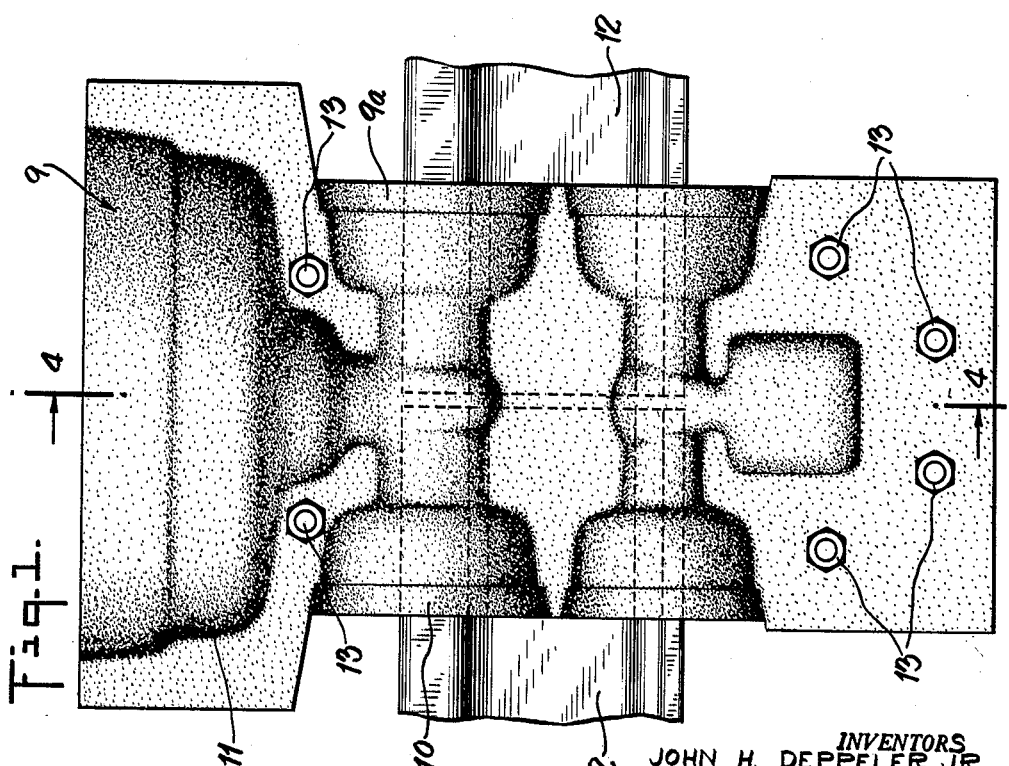

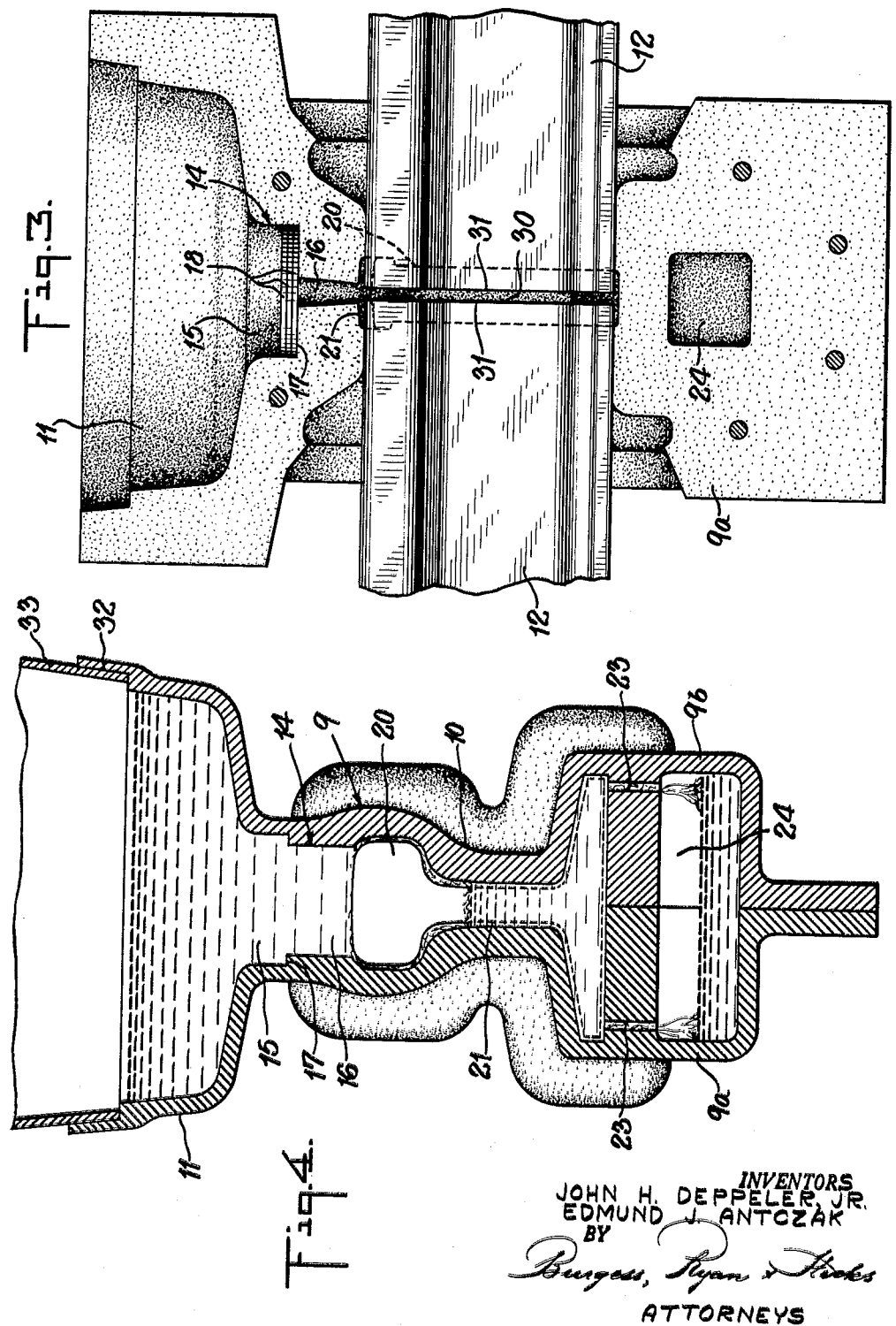

3,091,825
MOLD WELDING
John H. Deppeler, Jr., Brielle, and Edmund J. Antczak, Red Bank, N.J., assignors to Thermex Metallurgical, Inc., Lakehurst, N.J., a corporation of New Jersey
Filed Mar. 29, 1960, Ser. No. 18,336
15 Claims. (Cl. 22—116)

The present invention relates to the art of mold welding.

In the commercial alumino-thermic process of welding metal parts together, such as rails, the parts are aligned end to end, a mold is placed around these parts in the region of the weld to be formed, a charge of alumino-thermic mixture is ignited in a crucible located above the mold and the crucible is manually tapped at the right time to deliver superheated molten metal to the mold. A fusible tap control disc may be employed in the tap hole of the crucible as a plug to prevent the alumino-thermic mixture after it has become ignited and fused, from discharging before the metal has had time to become completely melted and superheated and the alumino-thermic slag to completely form and collect at the top. At the proper time, the metal disc melts and the crucible is automatically tapped.

In very small welds, where the amount of alumino-thermic mixture does not exceed, for example, 5 pounds, the single metal disc is sufficient for proper tap control. When the amount of alumino-thermic mixture exceeds, for example 5 pounds, a single metal disc will melt too rapidly and will therefore allow the reaction products to be tapped before the slag has completely separated from the molten metal. This, of course, will result in some of the slag finding its way in the weld metal and may also result in a lack of weld. It has been found in accordance with the present invention, that increasing the thickness of the single metal disc makes hardly any difference in the tapping time. For example, if a disc of 1/16 of an inch thick would melt in 15 seconds after a reaction has started, a 1/4 inch disc might increase this tap time to only about 20 seconds. If the thickness is further increased, the disc will have such high heat capacity that it will freeze the metal above it, and plug the crucible, so that no metal will flow therefrom.

One object of the present invention is to provide an automatic self-tapping alumino-thermic welding method and means which permit accurate control of tapping time and which lend themselves easily to variation to afford selectively a wide and accurate range of automatic tapping times.

It has been found in accordance with the present invention, that by using multiple discs, as for example, two discs, the tapping time is noticeably increased over the tap time afforded by one of these discs alone and over the tap time afforded by a single disc having the combined thickness of the multiple discs, and this tapping time can be accurately predetermined and controlled. This advantage results apparently from the minute air space between successive discs inhibiting heat transfer.

Also, in alumino-thermic processes now being employed, preheating cavities in the mold around the lined ends of the metal parts to be joined are filled with metal in producing the final weld and this results in excess of metal around these ends. This excess metal constitutes a source of shrinkage defects and a source of stress raiser due to sudden changes effected by said metal in the contour of the parts welded together.

During the cooling and solidification of liquid metal, this metal shrinks. The weld metal between confronting ends of the metal parts being welded shrinks first because of the heat extraction by the relatively cold parts. If the weld region has surplus metal around the outside, this metal while still molten feeds the internal shrinkage. When the surplus metal finally cools and there is no molten metal available to feed the shrinkage in this surplus metal, the surplus metal then ends up with shrinkage defects. Although the shrinkage defects may be confined to the excess metal, they can be a source of failure through fatigue, and they can be a source of grave concern to a customer, who examines his welds internally by one of the standard methods of non-destructive testing.

Another object of the present invention is to provide a new and improved mold welding process and means by which excess weld metal is eliminated, except that necessary by its wrap-around function to form a good weld between the parts to be joined.

To attain the latter object, the mold is formed without combustion or preheating chambers such as those commonly used in conjunction with torches or heating gases to preheat the adjoining sections of the metal parts to be welded together, and is designed to conform closely with the contours of the metal parts to be welded together except for a surrounding channel space which is only sufficiently deep to assure a good weld between the confronting ends of the parts to be joined. In view of the fact that the mold cavity is confined substantially to the space between the confronting ends of the metal parts to be joined, substantially the entire molten metal discharged into the mold cavity must pass between and sweep across the cold confronting ends of the metal parts, so that they will be gradually preheated by the passage of this metal. This expediency eliminates the use of special combustion or preheating chambers, requiring special heating mediums such as hot gases, or torch flames. The provision of any such special preheating passageways or chambers, would cause the molten metal discharged into the mold cavity to by-pass this space and flow into the less resistant path offered by these passageways and chambers, thereby losing a great deal of the preheating effect of the molten metal.

Besides the advantage of providing a means of preheating the metal parts to be welded together without the use of special preheating passageways or chambers, the features of the mold with a closely confining mold space results in a weld structure which has little excess material, except that necessary to form a good weld, and which consequently has a flexing characteristic akin to that of the parent metal and manifests none of the weaknesses characterizing weld structures having excess metals, such as those described.

A further object of the present invention is to provide a mold welding process and means by which better and more efficient transfer of heat from the molten weld metal to the parent metal is effected, and by which the rate at which the mold cavity is filled can be controlled.

To attain the latter object, the mold is provided with a discharge chamber or chambers just beyond the lowermost part of the mold cavity connected to the mold cavity by an exit gate or gates. The pouring or entrance gate is larger than the exit gate or gates, so that part of the molten metal streaming through the gap between the confronting faces of the metal parts being welded and preheating these faces, flows into the discharge chamber or chambers, while the remainder of the metal forms a liquid bath between these faces. By discharging some of the metal from the mold cavity, a greater amount of the superheated metal for preheating is made to flow across the confronting faces of the parts being welded together; the extent of this preheating would depend on the relative sizes of the entrance and exit gates.

The level of the liquid bath rises gradually and as new metal is discharged into said bath it creates a turbulence over the surface thereof. This turbulence improves the efficiency of heat transfer from the liquid metal to the parent metal, so that much welding is being done at that very moment. The rate of rise of the surface of the bath is governed by the relative dimensions of the entrance and exit gates, and the dimensions of the parts to be welded together determine to some extent the desirable rate of rise of the bath.

Also, in the process of alumino-thermic welding previously employed, the stream of molten metal tapped from a reaction crucible traverses an air gap before reaching the mold cavity. The radiant energy lost by the metal stream while crossing this gap is substantial and the amount of heat lost by conduction is also not insignificant. These heat losses leave the metal with insufficient temperature to effect proper welding, so that it is often necessary to use a higher temperature formulation to compensate for these losses, or it is necessary to stream more metal past the confronting faces of the parts to be welded to assure proper weld quality, and these add to the cost of the welding.

A further object is to provide a new and improved alumino-thermic welding process and means, by which heat losses during the stage of transferring molten metal from the reaction crucible to the mold cavity is reduced to a minimum.

To attain the latter object, a crucible and a mold are combined in such a way as to locate the tap hole directly over the mold cavity, so that the stream of molten metal tapped from the crucible does not traverse any air gap before reaching the mold cavity. This results in a highly efficient weld with a minimum of cost.

Various other objects, features and advantages of the invention are apparent from the following description and from the accompanying drawings, in which FIG. 1 is a side view of a two-part alumino-thermic mold assembly embodying the present invention and shown applied to the welding of T-rail parts together;

FIG. 2 is an end view of the alumino-thermic mold assembly shown in FIG. 1;

FIG. 3 is an inside face view of one part of the mold assembly of FIG. 1 but shown with the two rail parts to be welded together set-up end to end for welding;

FIG. 4 is a section of the weld assembly taken on lines 3—3 of FIG. 1 but shown after the crucible has been tapped and before the mold cavity has been filled up;

FIG. 5 is a perspective of the rail after welding, the end of the rail being shown as a section taken through the middle of the weld region; and FIG. 6 is a side view of the welded rail after the upper tread-portion of the rail has been finished.

Referring to the drawings, the welding unit 9 comprises a mold 10 and a crucible 11 and is shown for the purpose of illustration designed to weld together T-rail parts 12, but the principle illustrated can be employed for the welding of metal parts of any shape. More specifically, the welding unit 9 is shown of the shell porous type, made for example, of sand bonded together by a resin such as phenol-formaldehyde, so that the mold is self-venting and the unit expendable, but it need not be of this specific type.

The welding unit 9 is of the split form comprising two duplicate sections 9a and 9b, each made of one piece. These welding unit sections 9a and 9b are adapted to be bolted together through holes 13 or joined together by clamps, and conjointly define the lower mold 10 and the upper crucible 11 for the alumino-thermic mixture. This crucible 11 has an outlet 14 in the form of a neck, circular at its upper section 15 and of reduced rectangular cross-section at its lower section 16 to form a shoulder 17 serving as a seat for a plurality of circular metal tap control discs 18 (three being shown) adapted to fit snugly in said upper outlet section. The lower section 16 of the crucible outlet 14 serves not only as the tap hole for the crucible 11 but also as the entrance gate for the mold 10, so that the stream of metal drawn from the crucible is not exposed to the atmosphere before entering the mold. This obviates heat losses in the tapped metal from radiation or conduction to the atmosphere.

The welding unit sections 9a and 9b also conjointly define a mold cavity 20 for receiving in end to end alignment and in spaced relationship the sections of the metal parts 12 to be welded together. This mold cavity 20 conforms in outline to the contour of the metal parts 12 to be welded together except for a shallow channel 21 around the perimeter of said cavity, just sufficiently deep and sufficiently wide to form a thin band in the region of the junction between said parts assuring a good solid weld therebetween. In the case of a rail mold, the mold cavity 20 will have a T-shape cross-section conforming close to that of the rail parts 12 to be welded, except for the band forming channel 21 around the sides and bottom of the cavity in the order of about ⅛ inch deep and about 1 inch wide.

Communicating with the mold cavity 20 through bottom exit gates 23, is a sump or discharge chamber 24. This chamber 24 is shown below the exit gates 23, but may be disposed above the exit gates, as long as it is located in position to cause the discharge from the mold cavity 20 to flow therein by gravity or by hydrostatic head.

Two exit gates 23 are shown at opposite sides of the bottom of the mold cavity 20, to assure the flow of molten metal across substantially the entire area of the confronting end faces of these parts before the metal is discharged through these gates into the sump chamber 24. The total cross-sectional area of these exit gates 23 is smaller than the cross-sectional area of the tap hole or entrance gate 16, to permit the molten metal to flow into the mold cavity 20 at a greater rate than it is discharged therefrom through the exit gates 23, and to permit thereby the metal bath formed in the mold cavity 20 to rise. The dimensions of the metal parts to be welded together determine to some extent the relative cross-sectional areas of the entrance gate 16 and of the exit gates 23 and thereby the rate of rise of the metal bath in the mold cavity 20.

Also, the size of the sump or discharge chamber 24 may depend on the shape of the metal parts to be welded together. For example, this chamber 24 may be so large that it does not entirely fill up during the entire welding operation, in which case, the rate of increase in the volume of the metal bath in the mold cavity 20 remains substantially constant during this entire welding operation, except as might be modified by the solidification of the metal at the bottom of the mold cavity, or the shape of the metal parts may be such as to require a quick rise in the level of the metal bath during an intermediate or terminal stage of the welding operation, in which case, the discharge chamber 24 may be small enough to fill up entirely before the end of the metal tapping cycle. Also, where the sump or discharge chamber or chambers 24 are arranged, for example, on the side or sides of the mold cavity 20 so that metal flows thereon as the result of hydrostatic head, the chamber or chambers may be shaped to afford a varying pattern of rate of discharge of the molten metal from said chamber or chambers, according to the shape of the metal parts to be welded or the desired rate of rise of the level of the metal bath in the mold cavity at different stages of the welding operation.

In the following process of the present invention the two parts 12 to be welded together are arranged so that they will be in alignment end to end and separated by a gap 30. In the case where rail parts 12 are to be welded together the gap 30 may be in the order of ¼ to ½ inch.

The welding unit sections 9a and 9b are brought together around the metal parts 12 to be welded together, so that the gap 30 between the end confronting faces 31 of these parts is located centrally between the sides of the band forming channel 21 of the mold cavity 20, and these welding unit sections are bolted or clamped together. The tap control discs 18 are then set on the seat 17 of the crucible outlet 14 and a charge of alumino-thermic material is placed in the crucible 11. The discs 18 are desirably made of a metal according to the tapping time required and in the case where the parts 12 to be welded together are rails, the discs could be of steel. Each of these discs 18 may be in the order of about 1/16 inch thick, and the number thereof corresponds to the desired tapping time. The number of these tap control discs 18 should be sufficient to assure enough delay before tapping to permit the alumino-thermic reduction to be substantially completed, any metallic additives present to be completely melted and the alumino-slag to be completely collected on top.

The crucible 11 may have a recess 32 at its upper section to receive an extension skirt 33, where the size of the alumino-thermic charge justifies it, as shown in FIG. 4.

The alumino-thermic charge in the crucible 11 consisting essentially of metal oxide and aluminum is ignited in the manner well-known in the art to produce metal and aluminum oxide, and the exothermic heat created by this reaction melts and superheats the metal and at the right time melts the entire stack of tap control discs 18. In the specific case where rails are to be welded, the metal oxide in the alumino-thermic charge would be essentially iron oxide and said charge would contain the necessary alloying metals and/or other additives to form steel.

The melting of the tap control discs 18 will cause the discharge of the molten metal through the tap hole 16 and into the mold cavity 20.

Since the boundaries of the mold cavity 20 follow conformably close to the contours of the parts 12 to be welded, and since there are no special by-passing passageways for preheating mediums, the tapped molten metal will pass almost exclusively through the gap 30 and between the cold confronting end faces 31 of said metal parts, thereby preheating said end faces and thereby the regions of said parts in the vicinity of said faces. The molten metal as it passes through the gap 30, sweeps across these faces 31 to the bottom of the parts 12 being welded, and to opposite sides thereof to the exit gates 23 and is discharged into the sump chamber 24. Since the metal is delivered to the mold cavity 20 through the entrance gate or tap hole 16 at a greater rate than it is discharged through the exit gates 23 into the sump chamber 24, the molten metal will accumulate in the air gap 30 to form a metal bath therein, and the surface of this bath will rise at a rate slower than would be possible in the absence of the exit gates, thereby affording sufficient time to properly preheat the adjoining end sections of the metal parts 12. The relative cross-sectional areas of the entrance and exit gates 16 and 23 depend on the desired rate of rise of the metal bath surface in the mold cavity 20, and this rate of bath rise depends on the shape and dimensions of the metal parts to be welded together.

As the stream of molten metal strikes the rising surface of the metal bath, it creates turbulences in said surface, and this is helpful in promoting heat transfer to the metal parts and in transmitting heat from the interior of the bath towards the confronting end faces 31 of the metal parts 11.

As the metal solidifies and shrinks the molten metal above it serves as a hot top to feed this shrinkage. Since there is no excess material on the outside to feed the interior shrinkage no shrinkage defects are produced on the outside of the weld.

The metal fuses the end sections of the metal parts 12 to form a homogeneous weld with and between these parts and also fills up in the channel 21 to form a wrapping band 34 around the weld area, only thin enough to assure a good solid weld between the parts, and not thick enough to develop any shrinkage defects therein or interrupt materially the continuity between the metal parts welded together. Any material interruption in the continuity of the weld region between the metal parts due to excess material interferes with the flexibility of said region and develops structural weaknesses when subjected to fatigue.

After the welding operation has been completed, the welding unit 9 is removed or broken away. The resulting weld will be as shown in FIG. 5. In the case of a rail, the upper section of the welded rail is ground and finished off to present a smooth tread, as shown in FIG. 6.

Although each half of the mold 10 and of the crucible 11 are shown combined into an integral unit, as far as certain aspects of the invention are concerned, it is possible to have the crucible separate from the mold, but so arranged in relation thereto, that the metal tapped from the crucible discharges into the mold cavity without being exposed to the atmosphere.

While the invention has been described with particular reference to a specific embodiment, it is to be understood that it is not to be limited thereto, but is to be construed broadly and restricted solely by the scope of the appended claims.

What is claimed is:

1. The combination of a crucible for holding an exothermic reactive mixture which results in a superheated molten metal for a mold, said crucible having an outlet, and a stack of discs in said outlet conjointly serving as a plug for said crucible adapted to be fused by the heat of reaction of said mixture to control the tap time of said crucible.

2. The method of controlling the tap time of a crucible containing an exothermic reactive mixture which results in superheated molten metal for a mold and having an outlet, which method comprises placing across said outlet before starting the reaction of said mixture a stack of discs to serve conjointly as a plug for said crucible, said stack being adapted to be fused therethrough by the heat of reaction of said mixture when the superheated molten metal product of said mixture has reached a proper stage for tapping.

3. The method of controlling the tap time of a crucible containing an alumino-thermic mixture for mold welding and having an outlet, which comprises placing across said outlet a stack of discs to serve conjointly as a plug for said crucible, said stack being adapted to be fused therethrough by the heat of reaction of said mixture when the metal product of said mixture has become superheated in molten state and substantially all of the slag has separated out, to cause the molten metal to be tapped.

4. A mold for welding two metal parts together having a mold cavity for enclosing therein the end sections of said metal parts in aligned end to end spaced relationship, said mold having entrance gate means, exit gate means and discharge chamber means on the discharge side of said exit gate means in communication with said exit gate means, said entrance gate means being relatively dimensioned to cause flow through said entrance gate means at a greater rate than discharge through said exit gate means, said mold cavity conforming in outline substantially to the contour of said end sections, whereby the flow of molten metal for welding is confined substantially to the space between the metal parts to effect preheating by the initial flow, and whereby a weld is formed between said end sections substantially free from any excess material interrupting the continuity between said end sections.

5. A mold for welding two T-rail parts together having a mold cavity for enclosing therein the end sections of said rail parts in aligned end to end spaced relationship, said mold having an entrance gate near the top of said mold cavity and a pair of exit gates near the bottom of said mold cavity near opposite sides respectively of said cavity, and discharge chamber means on the discharge sides of said exit gates in communication with said exit gates, whereby molten metal initially discharged into said mold cavity preheats the rail parts, said entrance gate and said exit gates being relatively dimensioned to cause flow through said entrance gate at a greater rate than total discharge through said exit gates, said discharge chamber means being closed, whereby when said discharge chamber means is filled with preheating metal, said metal in said discharge chamber means automatically stops flow through said exit gates.

6. A mold as described in claim 5, wherein said mold cavity conforms in outline substantially to the contour of said end sections, whereby the flow of molten metal for welding is confined substantially to the space between the rail parts to effect preheating by the initial flow, and whereby a weld is formed between said end sections substantially free from any excess material interrupting the continuity between said end sections.

7. The method of welding two metal parts together end to end, which comprises aligning the metal parts end to end and spacing them by a gap, and flowing a stream of superheated molten metal through said gap between the confronting faces of said metal parts to preheat said faces exclusively from said molten metal while discharging part of the molten metal from the bottom of said gap through exit means into a closed chamber at a rate sufficient to permit a molten liquid bath to form and accumulate in said gap from the beginning of the flowing period, and until the metal in said gap reaches a level therein sufficient to form the required weld between said metal parts.

8. In combination, a crucible for holding an exothermic reactive mixture which results in a superheated molten metal, said crucible having a tap outlet, a mold for welding two metal parts together having a mold cavity for enclosing therein the end sections of said metal parts in aligned end to end space relationship, said cavity conforming in outline substantially to the contour of said end sections, whereby a weld is formed between said end sections substantially free from any excess weld metal interrupting the continuity between said end sections, said mold having an entrance gate in direct communication with said outlet free from an intervening air gap therebetween, exit gate means, and discharge chamber means on the discharge side of said exit gate means in communication with said exit gate means, whereby metal initially discharged into said mold cavity serves to preheat the metal parts said entrance gate and said exit gate means being relatively dimensioned to cause flow through said entrance gate at a greater rate than discharge through said exit gate means, said discharge chamber means being closed, whereby when said discharge chamber means is filled with preheating metal, said metal in said discharge chamber means automatically stops flow through said exit gate means.

9. The combination as described in claim 8, wherein said mold and said crucible constitute at least two units adapted to be put together to form conjointly the combined mold and crucible, each of said units being in one piece and having a crucible part and a mold part, and said crucible outlet and said entrance gate forming one continuous passageway.

10. A mold for welding two metal parts together having a mold cavity for enclosing therein the end sections of said metal parts in aligned end to end spaced relationship, said mold having entrance gate means, exit gate means near the bottom of said mold cavity and discharge chamber means on the discharge side of said exit gate means in communication with said exit gate means, whereby molten metal initially discharged into said mold cavity preheats said metal parts, said entrance gate means being relatively dimensioned to cause flow through said entrance gate means at a greater rate than discharge through said exit gate means, said discharge chamber means being closed, whereby when said discharge chamber means is filled with preheating metal, said metal in said discharge chamber means automatically stops flow through said exit gate means.

11. A mold as described in claim 10, wherein said discharge chamber means comprises a chamber, and said exit gate means connects into said chamber near the top thereof.

12. A mold as described in claim 10, wherein said discharge chamber means comprises a chamber having a boundary wall integral with the mold cavity walls to form a self-contained unit with said mold cavity walls.

13. A mold for welding two metal parts together having a mold cavity for enclosing therein the end sections of said metal parts in aligned end to end spaced relationship, said mold having entrance gate means, exit gate means near the bottom of said mold cavity, and discharge chamber means on the discharge side of said exit gate means in communication with said exit gate means, whereby molten metal initially discharged into said mold cavity preheats the metal parts, said discharge chamber means being closed, whereby when said discharge chamber means is filled up with preheating metal, said metal in said discharge chamber means automatically stops flow through said exit gates.

14. A mold as described in claim 13, wherein said mold is made of porous material through which the gases from the interior of the mold cavity can escape, and wherein said discharge chamber means comprises a chamber having a porous boundary wall integral with the mold cavity walls to form a self-contained unit with said mold cavity walls, said exit gate means connecting into said chamber near the top thereof.

15. The combination as described in claim 8, wherein said discharge chamber means comprises a chamber having a boundary wall integral with the mold cavity walls to form a self-contained unit with said mold cavity walls, and wherein said exit gate means connect into the upper part of said chamber.

References Cited in the file of this patent

UNITED STATES PATENTS

| | | |
|---|---|---|
| 717,840 | Goldschmidt | Jan. 6, 1903 |
| 729,573 | Goldschmidt | June 2, 1903 |
| 825,541 | Jacobs | July 10, 1906 |
| 1,007,005 | Lukazewske | Oct. 24, 1911 |
| 1,119,088 | McKenna | Dec. 1, 1914 |
| 1,446,678 | Wilks | Feb. 27, 1923 |
| 1,533,803 | Keithley | Apr. 14, 1925 |
| 1,534,022 | Begtrup | Apr. 21, 1925 |
| 1,542,598 | Begtrup | June 16, 1925 |
| 1,607,117 | Delachaux | Nov. 16, 1926 |
| 1,892,376 | Begtrup | Dec. 27, 1932 |
| 1,938,707 | Mann | Dec. 12, 1933 |
| 2,294,886 | Angel | Sept. 8, 1942 |

FOREIGN PATENTS

| | | |
|---|---|---|
| 42,492 | Germany | Feb. 11, 1888 |
| 351,977 | Great Britain | June 25, 1931 |